US008371927B2

(12) United States Patent
Englman

(10) Patent No.: US 8,371,927 B2
(45) Date of Patent: Feb. 12, 2013

(54) GAMING MACHINE HAVING PLAYER SELECTABLE VOLATILITY

(75) Inventor: Allon G. Englman, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1450 days.

(21) Appl. No.: 11/922,111

(22) PCT Filed: Jun. 14, 2006

(86) PCT No.: PCT/US2006/023990

§ 371 (c)(1), (2), (4) Date: Dec. 13, 2007

(87) PCT Pub. No.: WO2007/002095

PCT Pub. Date: Jan. 4, 2007

(65) Prior Publication Data

US 2010/0016055 A1 Jan. 21, 2010

Related U.S. Application Data

(60) Provisional application No. 60/693,325, filed on Jun. 23, 2005.

(51) Int. Cl.
*A63F 9/24* (2006.01)
*A63F 13/00* (2006.01)

(52) U.S. Cl. ............................... 463/20; 463/16; 463/17

(58) Field of Classification Search .................... 463/16, 463/17, 20

See application file for complete search history.

(56) References Cited

U.S. PATENT DOCUMENTS

| | | | | |
|---|---|---|---|---|
| 6,068,552 | A * | 5/2000 | Walker et al. | 463/21 |
| 6,939,224 | B2 * | 9/2005 | Palmer et al. | 463/16 |
| 7,374,485 | B2 * | 5/2008 | Mezen et al. | 463/20 |
| 2001/0034261 | A1 * | 10/2001 | Gadot et al. | 463/16 |
| 2003/0176215 | A1 | 9/2003 | Palmer et al. | 463/25 |
| 2004/0048646 | A1 * | 3/2004 | Visocnik | 463/16 |
| 2004/0121833 | A1 * | 6/2004 | Mezen et al. | 463/16 |
| 2004/0242302 | A1 * | 12/2004 | Baerlocher | 463/16 |
| 2005/0043092 | A1 * | 2/2005 | Gauselmann | 463/36 |
| 2005/0064933 | A1 * | 3/2005 | Davis | 463/20 |
| 2006/0205476 | A1 * | 9/2006 | Jubinville | 463/17 |

OTHER PUBLICATIONS

Written Opinion corresponding to International Patent Application Serial No. PCT/US2006/023990, European Patent Office, dated Oct. 31, 2006, 3 pages.

International Search Report corresponding to International Patent Application Serial No. PCT/US2006/023990, European Patent Office, dated Oct. 31, 2006, 2 pages.

* cited by examiner

*Primary Examiner* — Melba Bumgarner
*Assistant Examiner* — Frank M Leiva
(74) *Attorney, Agent, or Firm* — Nixon Peabody LLP

(57) ABSTRACT

A gaming machine for conducting a wagering game includes a value input device for receiving a wager and a display for displaying a plurality of symbols arranged on a plurality of reels. The symbols indicate a randomly-selected outcome selected from a plurality of possible outcomes, the plurality of outcomes including at least one winning outcome. The gaming machine further includes a controller operative to receive a volatility input from a player of the gaming machine. The controller is further operative to associate an award with the at least one winning outcome wherein the associated award is either a first award amount or a second award amount based upon the volatility input. Upon the occurrence of the at least one winning outcome, the controller awards the associated award to the player.

36 Claims, 16 Drawing Sheets

GAMING MACHINE HAVING PLAYER SELECTABLE VOLATILITY

CROSS-REFERENCE TO RELATED APPLICATIONS

This application is a U.S. National Stage of International Application No. PCT/US2006/023990, filed Jun. 14, 2006, which claims the benefit of Application No. 60/693,325 filed on Jun. 23, 2005, both of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having player selectable volatility.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Traditionally gaming machines operate under control of a processor which has been programmed to execute base games and bonus games on the machine according to a predetermined mathematical model. Therefore, the volatility of the gaming machines have been fixed or preset by the manufacturer. One shortcoming of such a configuration is that different players may desire differing degrees of volatility. Volatility generally means the ratio of size versus frequency of awards. Some players enjoy playing gaming machines with lower volatility, whereby the range of awards for winning outcomes is relatively narrow and the awards occur relatively frequently. Other players enjoy games with greater volatility, whereby the range of awards for winning outcomes is relatively large and the awards occur relatively less frequently. Due to the fixed programming nature of traditional gaming machines, players are forced to select their volatility by choosing amongst the variety of gaming machines available to be played at a casino. The present invention is directed to solving these and other problems.

SUMMARY OF THE INVENTION

According to one aspect of the present invention, a gaming machine for conducting a wagering game includes a value input device for receiving a wager and a display for displaying a plurality of symbols arranged on a plurality of rotatable reels. The symbols indicate a randomly-selected outcome selected from a plurality of possible outcomes, the plurality of outcomes including at least one winning outcome. The gaming machine includes a controller operative to receive a volatility input from a player of the gaming machine. The controller associates an award with the at least one winning outcome wherein the associated award is either a first award amount or a second award amount based upon the volatility input. Upon the occurrence of the at least one winning outcome, the controller awards the associated award to the player.

According to another aspect of the present invention, a gaming machine for conducting a wagering game includes a value input device for receiving a wager and a display for displaying a plurality of selectable elements. The gaming machine further includes a controller operative to receive a volatility input from a player of the gaming machine and associate a first selectable element with an award, the award chosen from either a first group of awards or a second group of awards based upon the volatility input.

According to another aspect of the invention, a method of conducting a wagering game on a gaming machine comprises receiving a wager from a player of the gaming machine and displaying a plurality of symbols. The method further comprises receiving a volatility input from the player and based upon the volatility input, selecting either a first range of awards or a second range of awards. The method further comprises associating a first group of the plurality of symbols with an award in the selected range.

According to yet another aspect of the invention, a computer readable storage medium is encoded with instructions for directing a gaming device to perform the above method.

Additional aspects of the invention will be apparent to those of ordinary skill in the art in view of the detailed description of various embodiments, which is made with reference to the drawings, a brief description of which is provided below.

DETAILED DESCRIPTION

Figure 1:
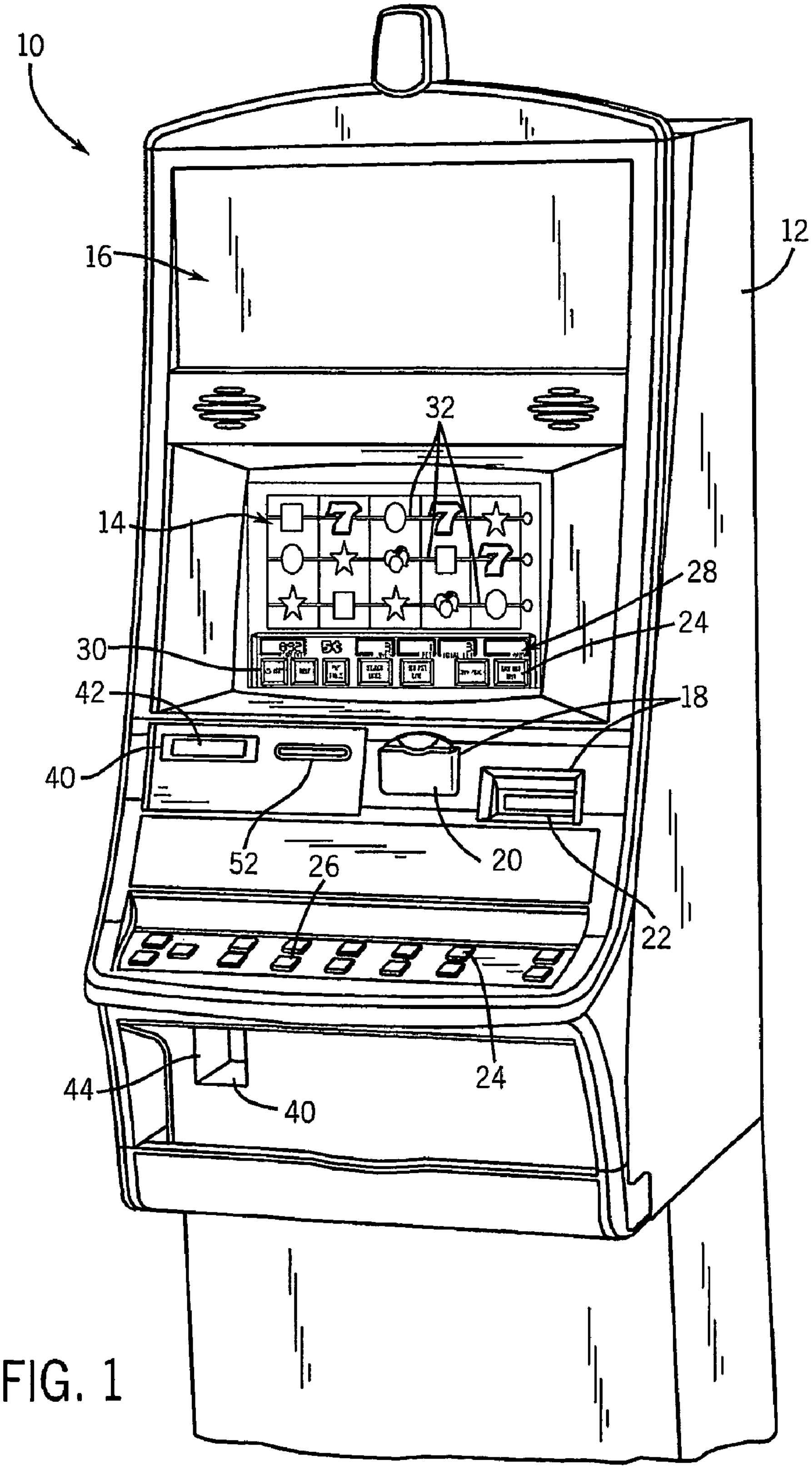
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual associated to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
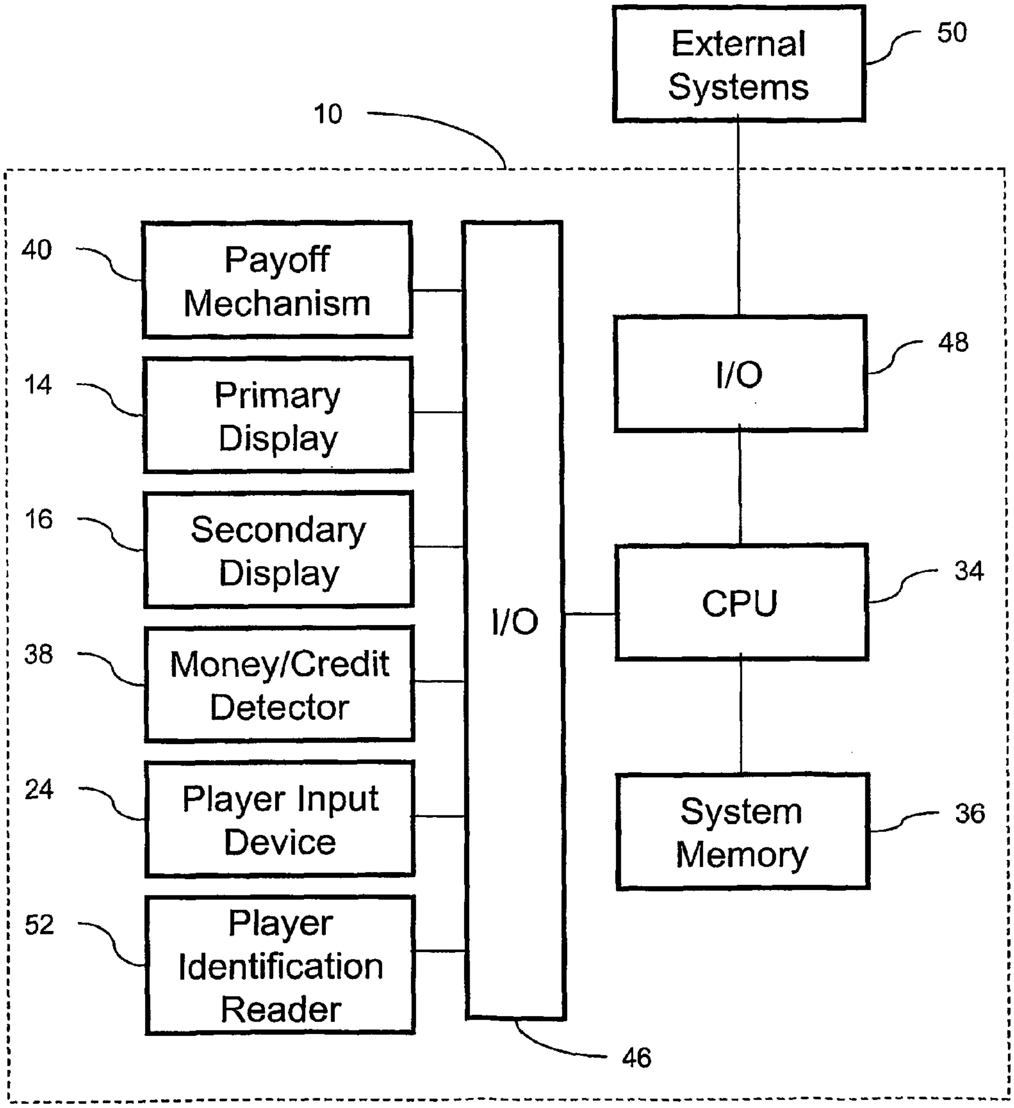
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
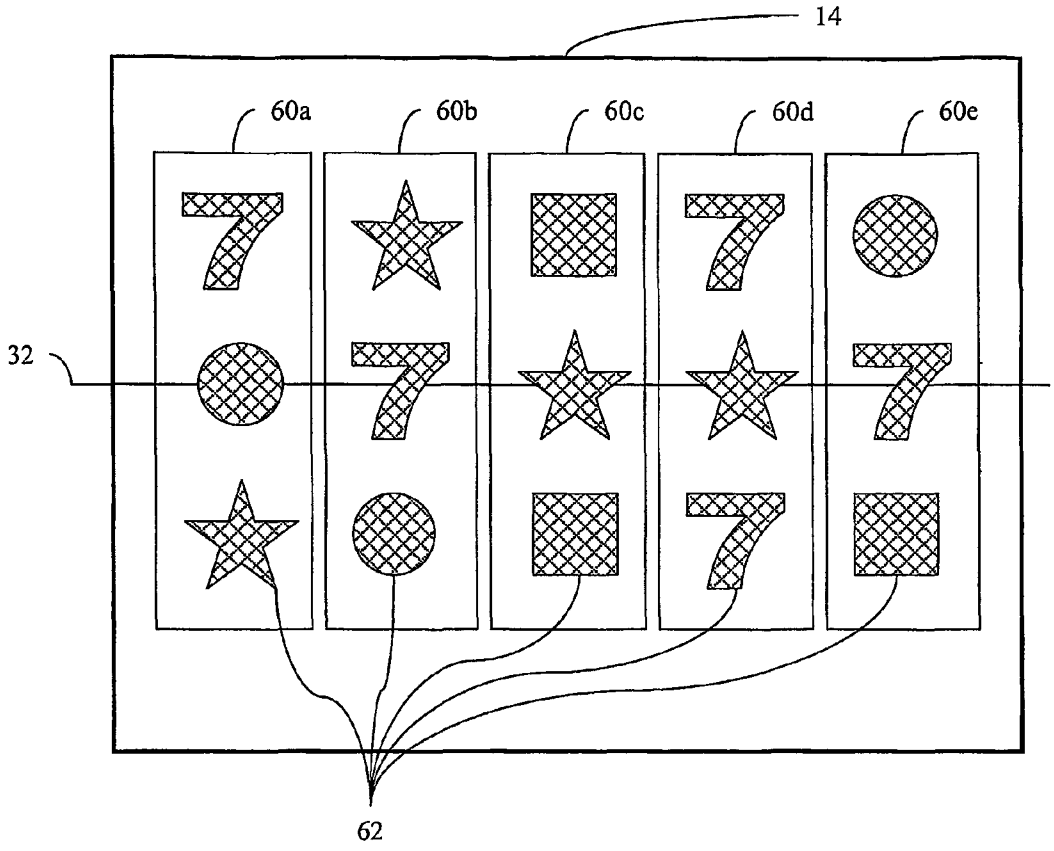
FIG. 3 is a front view of the display of the gaming machine.

Turning now to FIG. 3, the display 14 of the gaming machine 10 is depicted displaying a plurality of reels 60*a,b,c,d,e* and at least one payline 32. Each of the reels 60*a,b,c,d,e* includes a plurality of symbols 62 viewable via the display 14. The reels 60*a,b,c,d,e* may be either mechanical reels or video simulation of rotatable reels. Certain combinations of symbols 62 appearing on the payline 32 constitute winning combinations for which awards are earned. Although in this embodiment, the symbols 62 are arranged on reels 60*a,b,c,d,e*, it should be understood that the symbols 62 may be arranged in any array or matrix, for which certain combinations of symbols 62 may be designated as being winning combinations and associated with prizes or awards.

Figure 4:
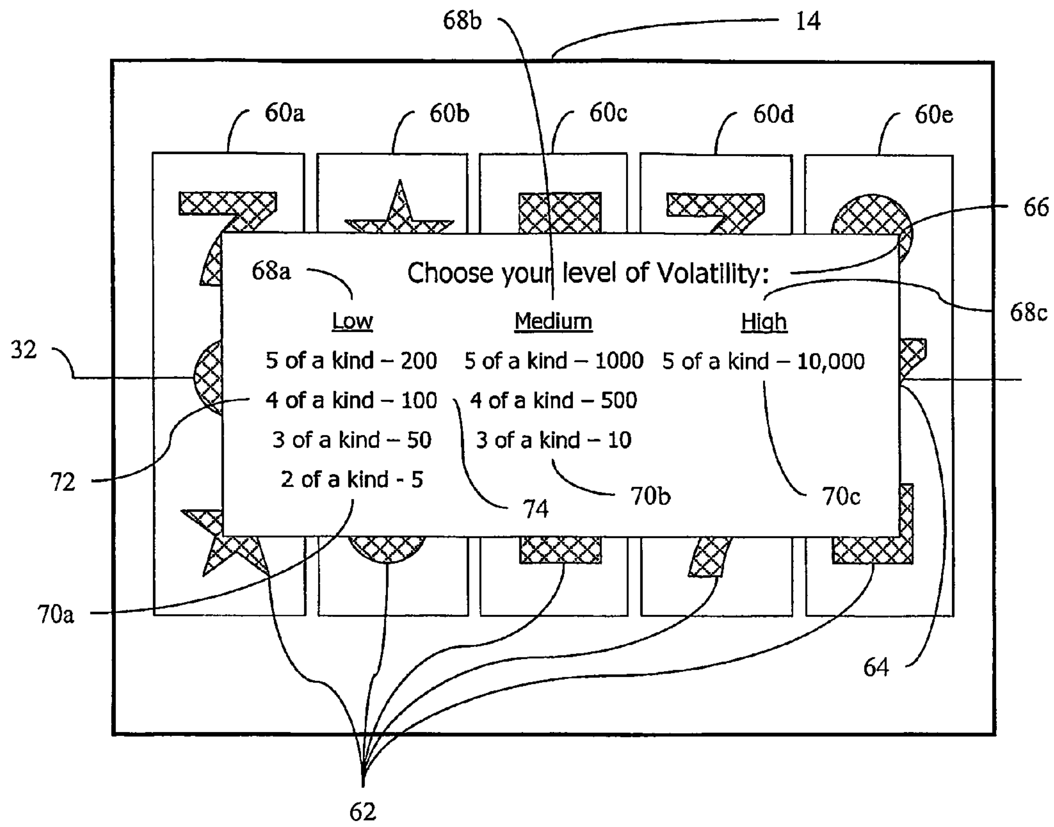
FIG. 4 is a front view of the display of the gaming machine, depicting a plurality of volatility inputs.

In FIG. 4, prior to a play of the gaming machine 10, a player is prompted to provide a volatility input via a selection screen or pop up window 64. The pop up window 64 includes a prompting message 66 to the player, which in this case indicates "Choose your level of Volatility." Additionally, the pop up window 64 includes a plurality of volatility selections 68*a,b,c* which preferably correspond to differing levels of volatility of play of the gaming machine 10. In this embodiment, the volatility selections 68*a,b,c* correspond with "Low", "Medium", and "High" volatility, respectively. Regardless of the volatility level selected by the player, the expected value (EV) of the game is preferably constant. The selected volatility level, however, affects the standard deviation of the actual award from this expected value. "High" volatility means that the standard deviation of the actual award from the expected value is relatively high; "low" volatility means that the standard deviation of the actual award from the expected value is relatively low (as compared to "medium" and "high"); and "medium" volatility means that the standard deviation of the actual award from the expected value is relatively medium (as compared to "high" and "low"). Each volatility selection 68*a,b,c* is associated with its own paytable 70*a,b,c* indicating a plurality of winning combinations 72. Each winning combination 72 is associated with an award 74. Generally, a selection of a higher volatility results in the gaming machine 10 being configured to award larger payouts, but less frequently, while lower volatility causes the gaming machine 10 to award smaller payouts, but more frequently.

As seen in FIG. 4, not every winning combination 72 is included in the paytable 70*a,b,c* for each volatility selection

68*a,b,c*. For example, the "Low" volatility selection 68*a* includes four winning combinations 72 for which awards 74 are paid, while the "High" volatility selection 68*c* includes only one winning combination 72 for which an award 74 is paid. Additionally, the same winning combination 72 may be included in the paytable 70 of more than one volatility selection 68*a,b,c*. As seen here, the "Five of a Kind" winning combination 72 appears in the paytable 70*a,b,c* of all three volatility selections 68*a,b,c*. However, in accordance with the invention, the award 74 associated with a particular winning combination 72 varies based upon the volatility selection 68*a,b,c*. As seen here, the "Five of a Kind" winning combination 72 pays an award 74 of 200 credits if the "Low" volatility selection 68*a* is chosen, and increases to an award 74 of 10,000 credits if the "High" volatility selection 68*c* is chosen.

Figure 5:
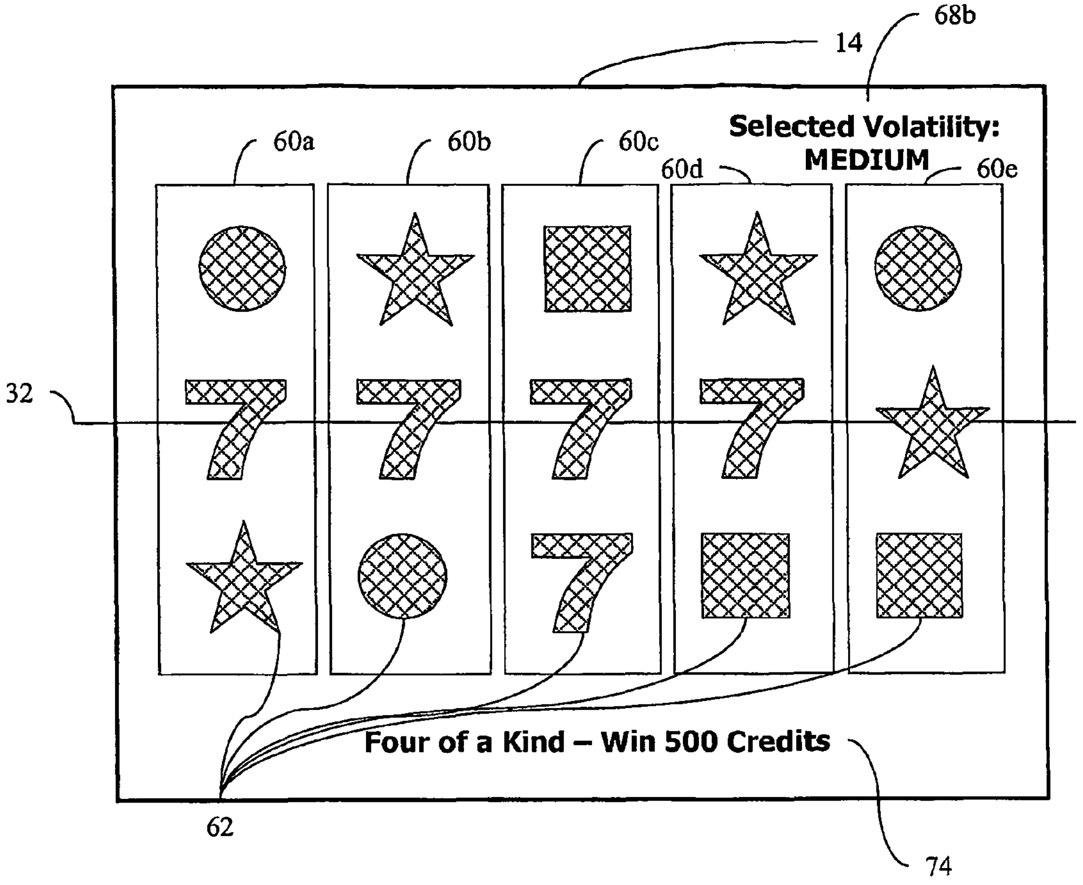
FIG. 5 is a front view of the display of the gaming machine, depicting a conclusion of a play of the game.

In FIG. 5, a play of the gaming machine 10 is depicted, following the receipt of the volatility input from the player. The display 14 indicates that the player has selected "Medium" volatility, corresponding with the second volatility selection 68*b*. This volatility input activates the paytable 70*b* associated with the "Medium" volatility selection 68*b*. Thus, the reels 60*a,b,c,d,e* and are spun and the symbols 62 landing on the payline 32 are evaluated against the activated paytable 70*b*. A "Four of a Kind" (four Sevens) winning combination 72 has landed on the payline 32, as seen in FIG. 5. Thus, an award 74 of 500 credits is awarded to the player in accordance with the paytable 70*b* of winning combinations 72*a,b,c* associated with the "Medium" volatility selection 68*b*. Had the "Four of a Kind" combination 72 landed following a "Low" volatility selection 68*a*, an award of only 100 credits would have been made in accordance with the first paytable 70*a*. Similarly, if the "Four of a Kind" combination 72 landed following a "High" volatility selection 68*c*, no award 74 would be given because the "Four of a Kind" combination 72 is not included in the paytable 70*c* associated with that volatility selection 68*c*.

Figure 6:
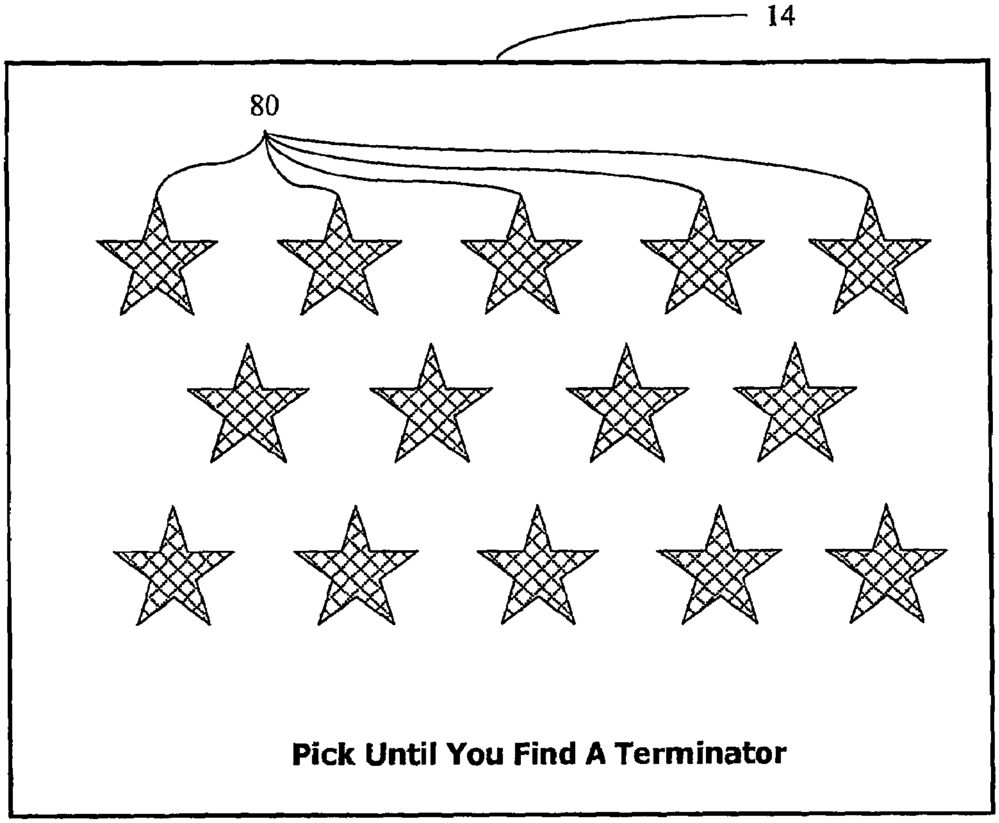
FIG. 6 is a front view of the display of a second embodiment of the gaming machine.
Figure 7:
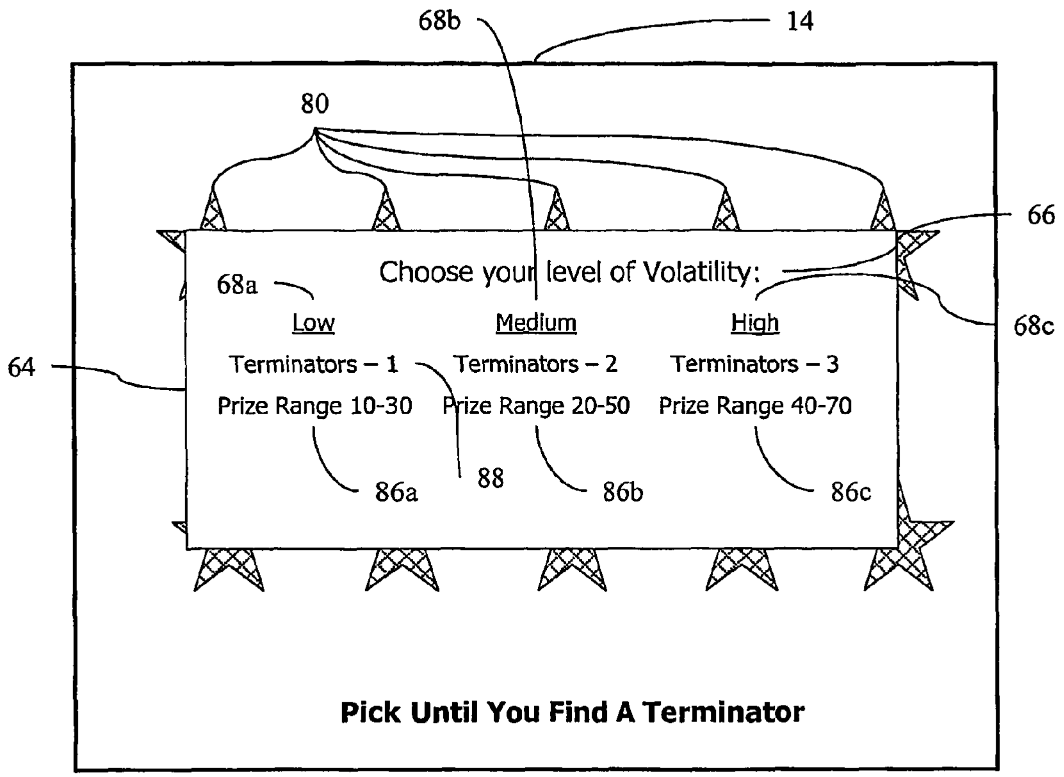
FIG. 7 is a front view of the display of FIG. 6, depicting a plurality of volatility inputs.

A second embodiment of the gaming machine 10 is depicted in FIGS. 6-9. In FIG. 6, the display 14 displays a plurality of selectable elements 80. In this embodiment, each of the selectable elements 80 is associated with either an award 82 or a terminator symbol 84, which is initially obscured from view by the symbol 80. In FIG. 7, the pop up window 64 allows the player to provide a volatility input by selecting one of three volatility selections 68*a,b,c*. In this embodiment, each volatility selection 68*a,b,c* has an associated award range 86*a,b,c* or group. Furthermore, each volatility selection 68*a,b,c* is associated with a predetermined number 88 of terminator symbols 84. Generally, a higher volatility selection is associated with larger awards and more terminator symbols while a lower volatility selection is associated with smaller awards and less terminator symbols. Here the player is again prompted by the prompting message 66 to "Choose your level of Volatility."

Figure 8:
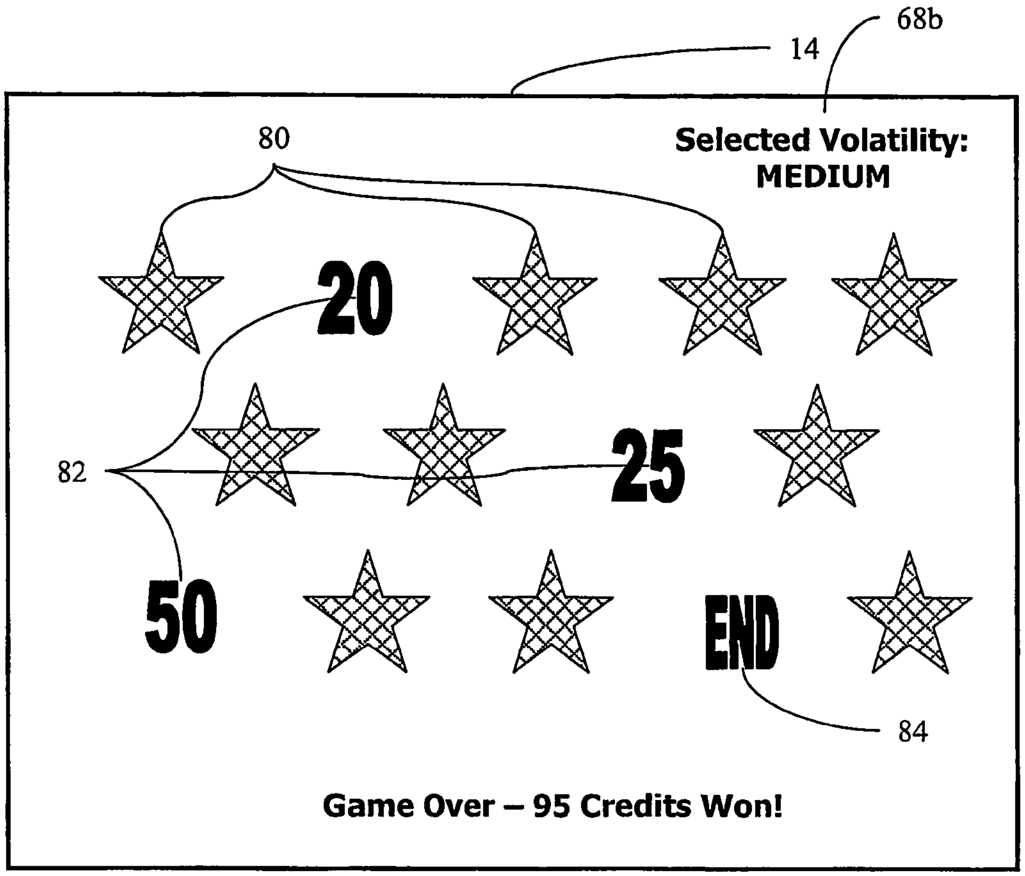
FIG. 8 is a front view of the display of FIG. 6, depicting a play of the game.

Turning to FIG. 8, a play of the gaming machine 10 according to the second embodiment is depicted. As indicated by the display 14, the player has provided a volatility input and selected the "Medium" volatility selection 68*b*. This selection 68*b* is associated with a predetermined number 88 of two terminator symbols 84, and an award range 86 of 20-50 credits (See FIG. 7). Thus, the plurality of selectable elements 80 in FIG. 8 has been populated by the controller 34 to be associated with awards 82 and terminator symbols 84. Thus, a first group of selectable elements 80 are associated with awards 82 while a second group of the selectable elements 80 are associated with terminator symbols 84. In accordance with the predetermined number 88, two terminator symbols 84 are associated with the selectable elements 80. Furthermore, the awards 82 associated with the remaining selectable elements 80 are selected from the award range 86 of 20-50 credits associated with the chosen volatility selection 68*b*.

Figure 9:
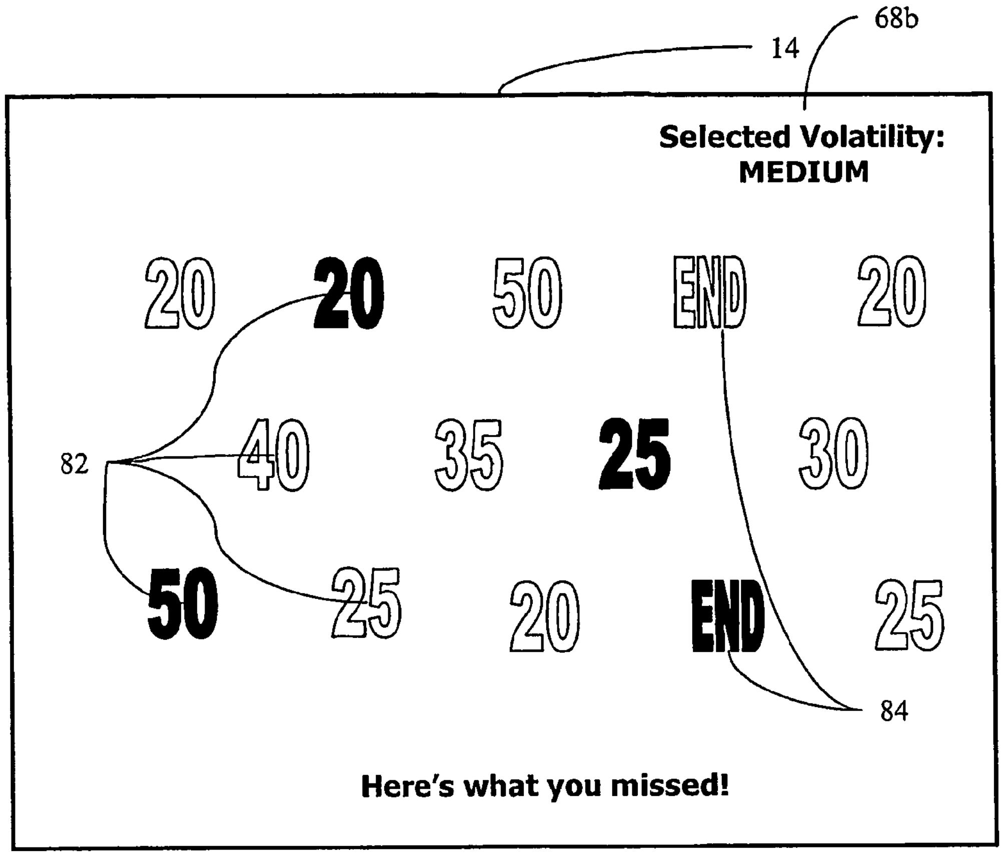
FIG. 9 is a front view of the display of FIG. 6, depicting a conclusion of a play of the game.

The player is permitted to make selections of the selectable elements 80 until he or she selects an element 80 associated with a terminator symbol 84. In FIG. 8, the player has made four selections of selectable elements 80. The first three selections were selectable elements 80 associated with awards 84 having values of 50, 20, and 25 respectively. As indicated, all of the awards 84 fall within the award range 86 of 20-50. The fourth selection made by the player is of a selectable element 80 in the second group, and thus is associated with a terminator symbol 84, which in this embodiment is the word "End." The selection of a selectable element 80 associated with a terminator symbol 84 ends the play of the game. The display 14 indicates to the player that the game is over, and that player has won a total of 95 credits. Optionally, following the end of the game, the display 14 may be configured to reveal the unselected elements 80, as seen in FIG. 9. Here, the remaining selectable elements 80 include awards 82 not won by the player, and the remaining terminator symbol 84. Thus in this second embodiment, the award ranges 86*a,b,c* and number of terminator symbols 84 vary depending upon the volatility selection 68*a,b,c*, made.

Figure 10:
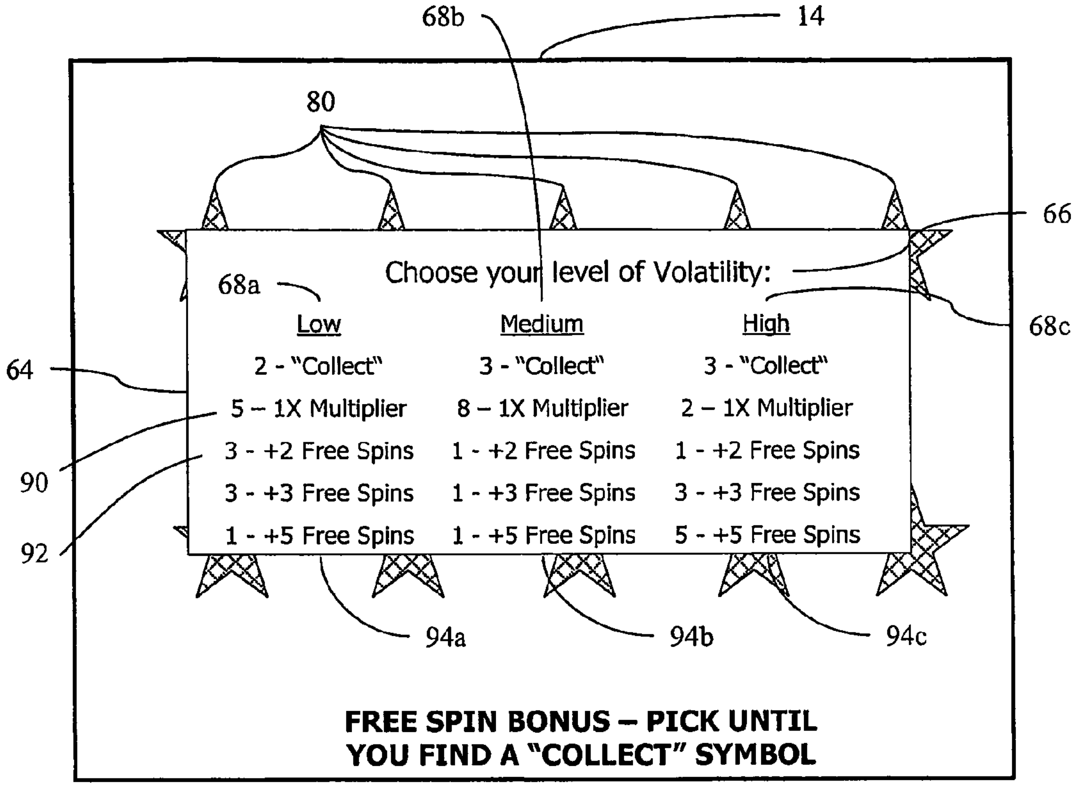
FIG. 10 is a front view of the display of a third embodiment of the gaming machine, depicting a plurality of volatility selections.
Figure 11:
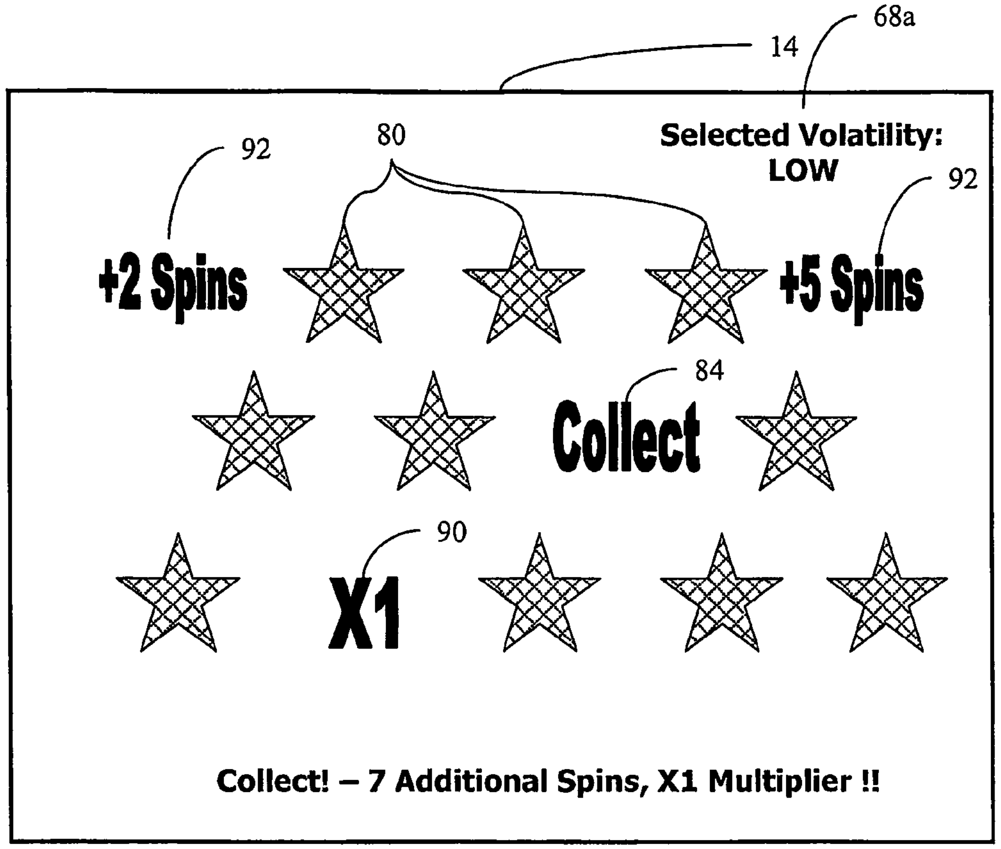
FIG. 11 is a front view of the display of FIG. 10, depicting a play of the game.
Figure 12:
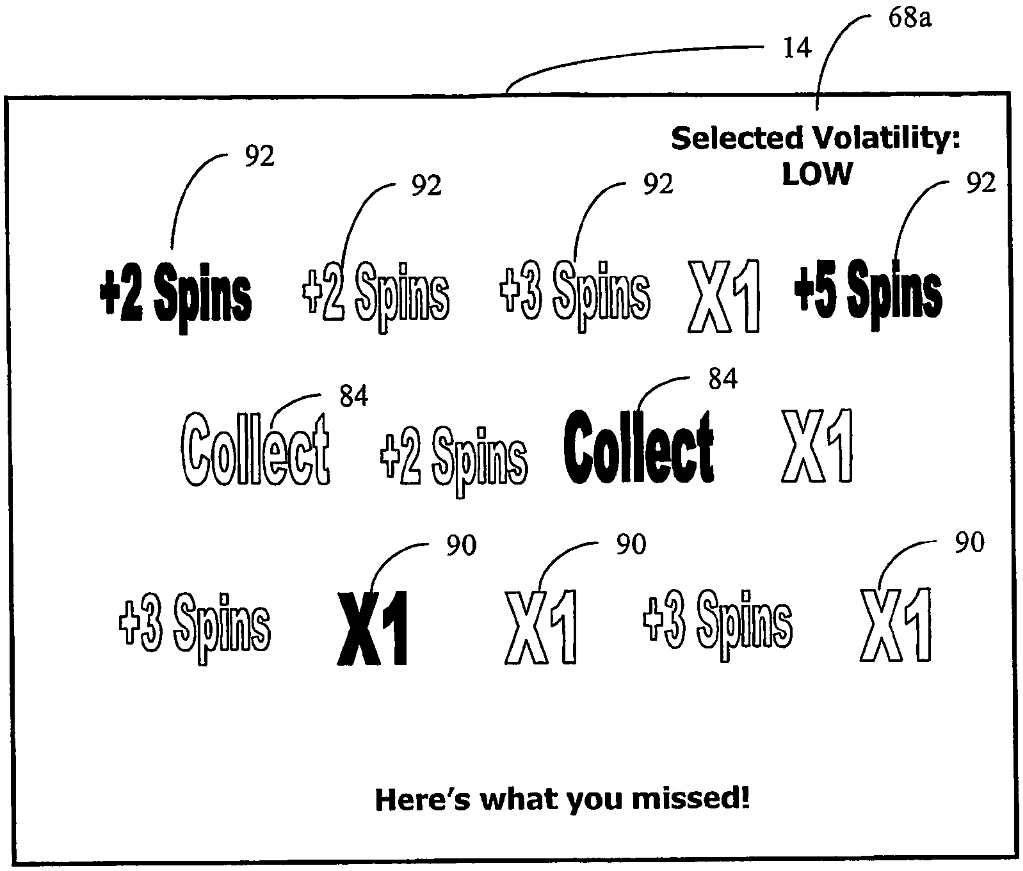
FIG. 12 is a front view of the display of FIG. 10, depicting a conclusion of a play of the game.

A third embodiment of the gaming machine 10 is depicted in FIGS. 10-12. In FIG. 10, the display 14 of the gaming machine 10 displays a plurality of selectable elements 80. A pop up window 64 displays to the player a variety of volatility selections 68*a,b,c* and prompts the player for a volatility input via a prompting message 66. Each volatility selection 68*a,b,c* is associated with certain awards 82 and a predetermined number 88 of terminator symbols 84, which in this embodiment are "Collect" symbols.

The awards 82 of the third embodiment differ in that they are awards 82 relevant to a Free Spins of Free Play bonus game of an underlying base game. In the bonus game of the third embodiment, the player is prompted to make selections of the selectable elements 80 and accumulate awards 82 applicable to a subsequent Free Spin game. In one embodiment, the Free Spin game is a series of free spins of a slot game having a plurality of reels, as described herein. Thus, rather than the awards 82 being credit amounts, such as in the second embodiment, the awards 82 include increased multiplier awards 90, and increased free spin awards 92 which increase the expected value of the Free Spin game executed subsequently. Each volatility selection 68*a,b,c* is associated with a differing combination of terminator symbols 84, increased multiplier awards 90 and increased free spin award 92, as displayed in an award schedule 94*a,b,c* associated with each volatility selection 68*a,b,c*. Generally, a higher volatility selection is associated with more terminator symbols and more valuable awards while a lower volatility selection is associated with less terminator symbols and less valuable awards.

In FIG. 11, a play of the bonus game of the third embodiment is depicted. The player has provided a volatility input by selecting the "Low" volatility selection 68*a*. Thus, the plurality of selectable elements 80 in FIG. 11 have been populated by the controller 34 to be associated with awards 82 (including increased multiplier awards 90 and increased free spin awards 92) and terminator symbols 84, in accordance with the award schedule 94*a* of the "Low" volatility selection 68*a*. Therefore, prior to the player selecting any of the selectable elements 80, the fourteen selectable elements 80 in FIG. 11 have been associated with two terminator symbols 84 ("Collect"), five increased multiplier awards 90 ("1× Multiplier"), and seven increased free spin awards (three "+2 Free Spins", three "+3 Free Spins" and one "+5 Free Spins").

As seen in FIG. 11, the player makes four selections of the selectable elements 80 before encountering an element 80 associated with a terminator symbol 84, thereby ending the bonus game. The first three selections made by the player reveal awards 82 including one increased multiplier award 90 and two increased free spin awards 92. The fourth selectable element 80 chosen by the player is associated with a terminator symbol 84, and upon the reveal of the "Collect" symbol, the bonus game ends. The display 14 indicates to the player that in the bonus game, he has accumulated awards 82 of seven additional free spins and one additional multiplier. Thus, when the subsequent free spins game begins, the player is awarded a standard number of free spins (e.g. 10 free spins), and an initial multiplier of one (1×). Because of the player's success in the bonus game, the awards 82 won are added to the standard amount giving the player 17 free spins and a 2× multiplier for the duration of the free spin game. Thus the awards 82 accumulated during the bonus game are added to a standard amount of free spins granted in the free spin game. As before, the unselected elements 80 may be revealed to the player as seen in FIG. 12, so that the player may see the awards 82 which were available to be won in the game in accordance with the schedule 94*a*. Thus, in third embodiment, the award schedules 94*a,b,c* (including the quantity of terminator symbols 84 and value of the awards 82) vary depending upon the volatility selection 68*a,b,c*, made.

Figure 13:
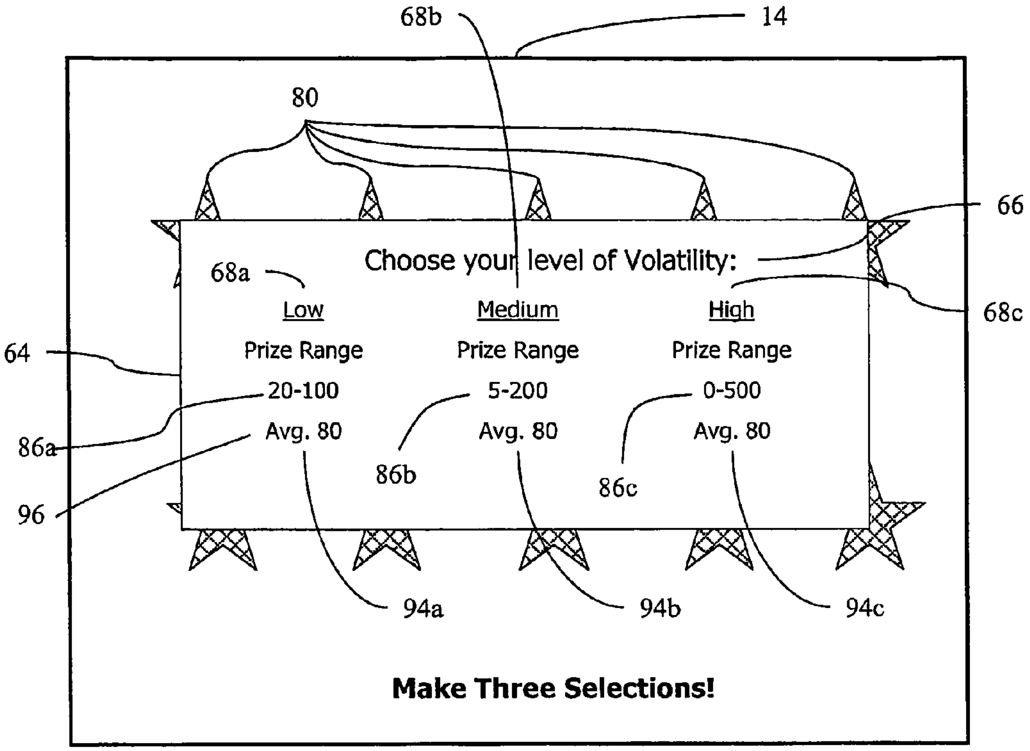
FIG. 13 is a front view of the display of a fourth embodiment of the gaming machine, depicting a plurality of volatility selections.
Figure 14:
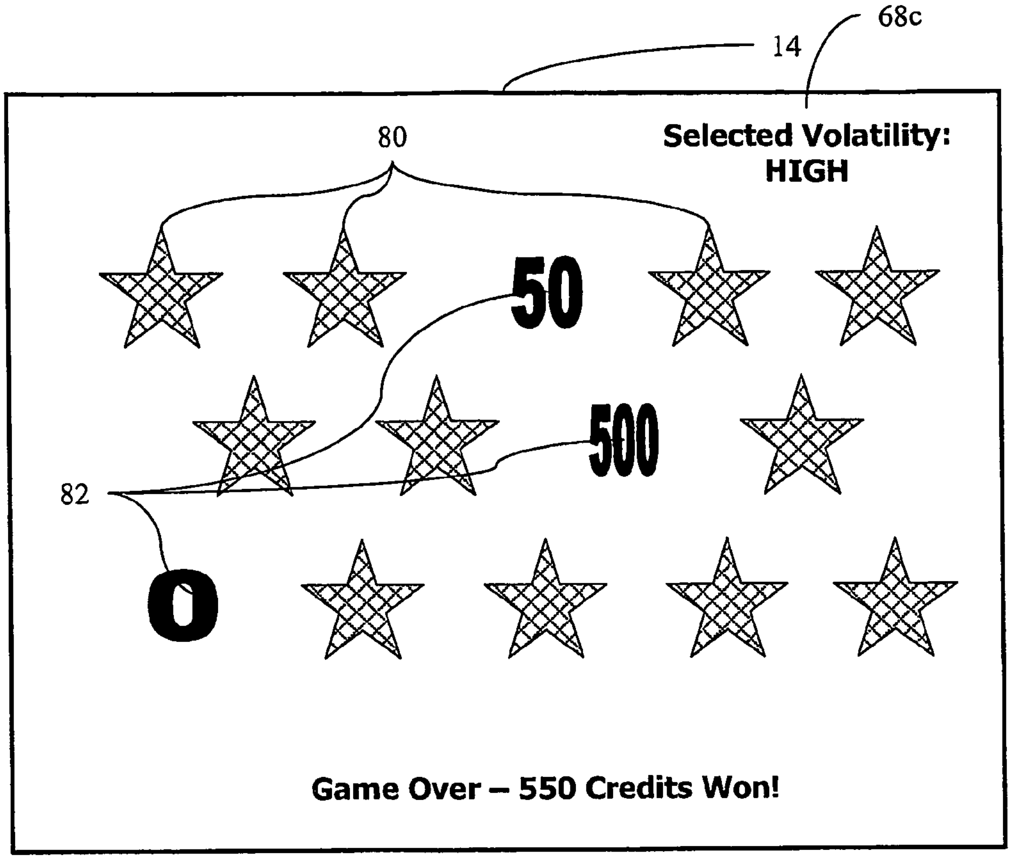
FIG. 14 is a front view of the display of FIG. 13, depicting a play of the game.

A fourth embodiment of the gaming machine 10 is depicted in FIGS. 13-16. Similar to the second embodiment, the player is presented with a plurality of selectable elements 80 from which to choose. The player provides a volatility input by selecting a volatility selection 68*a,b,c* presented to the player via a pop up window 64 on the display 14, as seen in FIG. 13. Each volatility selection 68*a,b,c* is associated with an award schedule 94*a,b,c* having an associated award range 86*a,b,c* or group, and an award average 96. The award ranges 86*a,b,c* are different for the varying volatility selections 68*a, b,c*, and preferably as the volatility increases from "Low" to "High", the associated award range 86*a,b,c* also increases, as see in FIG. 13. However, although the volatility selections 68*a,b,c* are associated with differing award ranges 68*a,b,c*, it is preferable that the award average 96 of each volatility selection 68*a,b,c* remain constant (e.g., award average 96 of 80 in FIG. 13).

Unlike the second embodiment which includes terminator symbols 84, the fourth embodiment operates to provide the player a predetermined number of selections of the selectable elements 80. Thus, the display 14 communicates to the player to "Make Three Selections." Turning to FIG. 14, the display 14 further indicates that the player has chosen the "High" volatility selection 68*c*. Therefore, the plurality of selectable elements 80 in FIG. 14 have been populated by the controller 34 to be associated with awards 82 selected from the award range 86*c* ("0 to 500'), in accordance with the award schedule 94*c* of the "High volatility selection 68*c*. The player then makes his three selections of the selectable elements 80, which reveal awards 82 of 0, 50, and 500 credits. The display 14 communicates to the player that he has won a total award of 550 credits. Thus, in this fourth embodiment, the ranges 86*a,b,c*, of the awards 82 vary depending upon the volatility selection 68*a,b,c*, made.

Figure 15:
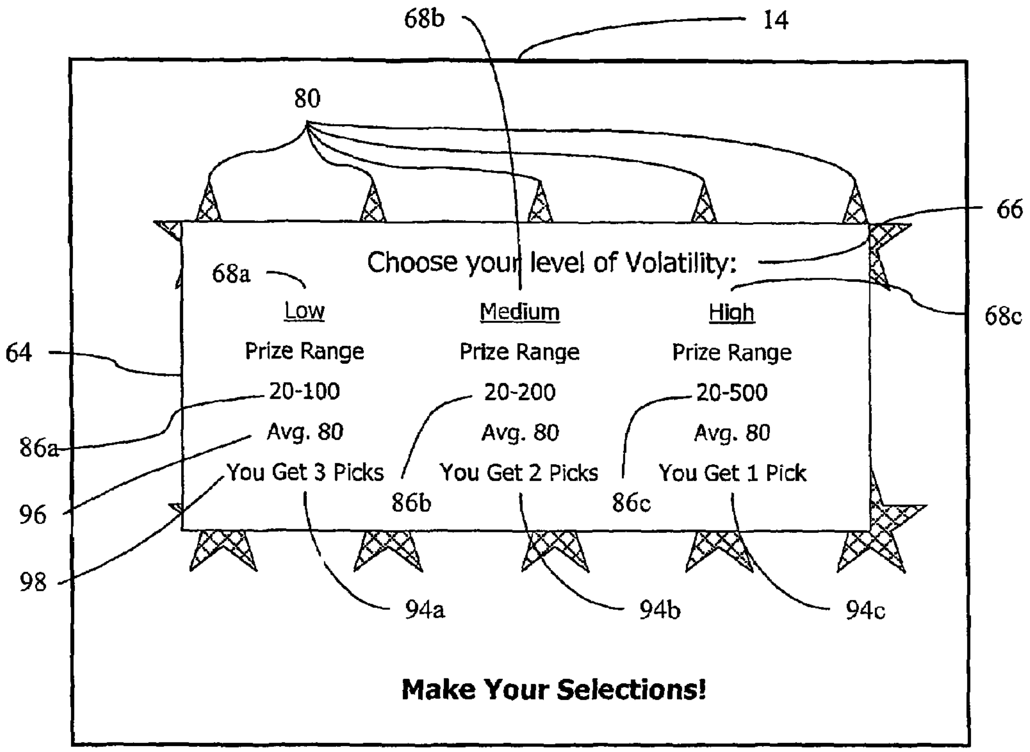
FIG. 15 is a front view of the display of FIG. 13, depicting an alternative configuration of the fourth embodiment.

In FIG. 15, an alternative of the fourth embodiment is depicted wherein the predetermined number of selections which the player is allowed to make is dependent upon the volatility selection 68*a,b,c*, chosen. Thus, in FIG. 15, each volatility selection 68*a,b,c*, in addition to being associated with an award schedule 94*a,b,c*, and an average award 96, includes a number of selections 98 granted to the player if that volatility selection 68*a,b,c* is made. The award schedules 94*a,b,c* all include ranges 86*a,b,c* of awards 82, which again preferably increase as the selected volatility increases.

Figure 16:
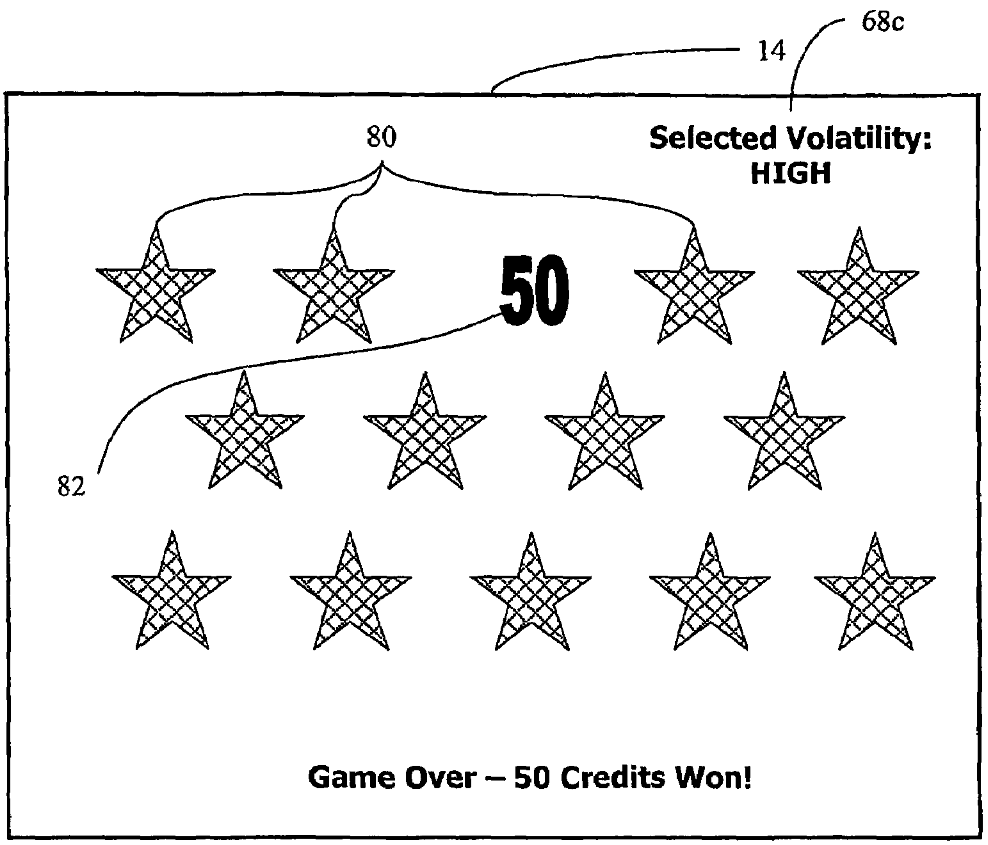
FIG. 16 is a front view of the display of FIG. 15, depicting a play of the game.

In FIG. 16, the player has provided a volatility input by selecting the "High" volatility selection 68*c*. In accordance with the award schedule 94*c* for that volatility selection 68*c*, the player is award only one selection 98 of the selectable elements 80. Furthermore, the plurality of selectable elements 80 in FIG. 16 have been populated by the controller 34 to be associated with awards 82 selected from the award range 86*c* ("20 to 500"), in accordance with the award schedule 94*c* of the "High" volatility selection 68*c*. In FIG. 16, the player has utilized his one selection 98 to choose a selectable element 80, which is associated with an award 82 of 50 credits. This award 82 is displayed to the player on the display 14 which indicates "Game Over—50 Credits Won." Thus, in this alternative, both the ranges 86*a,b,c* of awards 82 and the number of selections 98 vary depending upon the volatility selection 68*a,b,c*, made.

The gaming machine 10 of the present invention provides player selectable volatility which offers numerous benefits to both the player and the owner/operator of the gaming machine 10. By allowing the player the ability to select the level of volatility of the gaming machine 10, the player can customize the gaming machine 10 to offer an experience that is most preferable to the player's individual tastes. This customization configures the gaming machine 10 to play with high volatility and award a large range of awards, or with relatively lower volatility, and award a narrower range of awards. Customization of volatility may also be utilized to configure the gaming machine 10 to award larger awards relatively infrequently, or smaller awards more frequently, depending upon the player's preferences. These features provided added benefits to the player, who is encouraged to play more often at the gaming machine 10, and the owner/operator who, in turn, makes more money due to the increased play.

Each of these embodiments and obvious variations thereof is contemplated as falling within the spirit and scope of the claimed invention, which is set forth in the following claims.

What is claimed is:

1. A gaming machine comprising:

at least one input device for receiving inputs from a player, the inputs including a wager;

a display device; and a controller operative to (i) receive, via the input device, a selection of a volatility by the player corresponding to one of a plurality of available volatility selections, (ii) associate each of the volatility selections with a distinct composition of awards and one or more terminators such that no two of the volatility selections are associated with the same composition of awards and terminators and at least two of the volatility selections are associated with a different number of the one or more terminators, (iii) display on the display device a plurality of selectable elements corresponding to the awards and the one or more terminators of the composition associated with the volatility selected by the player, (iv) receive, via the input device, successive selections by the player of the selectable elements until the player selects a selectable element corresponding to the one or more terminators, and (v) cause the player to be awarded an award as a function of at least one of the awards associated with the selectable elements selected by the player prior to selecting the selectable element corresponding to the one or more terminators.

2. The gaming machine of claim 1, wherein the display device further displays the plurality of available volatility selections including an indication of (a) a volatility associated with each of the volatility selections, (b) the number of terminators associated with each of the available volatility selections, and (c) the group of awards associated with each of the available volatility selections.

3. The gaming machine of claim 2, wherein the number of terminators increases as the volatility associated with each of the available volatility selections increases.

4. The gaming machine of claim 1, wherein each of the distinct composition of awards includes any combination of credit amounts, free spins, and multipliers.

5. The gaming machine of claim 1, wherein the awards associated with one of the volatility selections has a range that is greater than a range of the awards associated with a different one of the volatility selections.

6. The gaming machine of claim 1, wherein the controller is operative to grant the player a predetermined number of selections of the plurality of selectable elements.

7. The gaming machine of claim 1, wherein each of the available volatility selections corresponds to an increasing volatility such that the awards associated with a lower volatility is selected from smaller awards and fewer terminators compared to the awards associated with a higher volatility, which is selected from larger awards and more terminators.

8. The gaming machine of claim 1, wherein the controller is further operative to (i) associate each award of the awards associated with at least one of the volatility selections with an amount that is within an award range of a predetermined minimum and maximum number of credit amounts, and to (ii) terminate further selections by the player of the selectable elements responsive to the player selecting the terminator via the at least one input device.

9. The gaming machine of claim 1, wherein the controller is further operative to (i) associate, according to an award schedule, each award of the awards associated with at least one of the volatility selections with a number of free spins or multipliers, to (ii) accumulate the number of free spins or multipliers associated with the selectable elements selected by the player until the player selects the selectable element corresponding to the one or more terminators, and to (iii) allow the player to play a number of additional games corresponding to the accumulated number of free spins, such that the expected value of the additional games is increased as a function of the number of free spins and the multiplier values associated with the multipliers.

10. The gaming machine of claim 9, wherein the award values of the awards and the number of terminators vary with each of the plurality of available volatility selections such that no two of the available volatility selections is associated with the same combination of award values and number of terminators.

11. The gaming machine of claim 1, wherein an award range within which each of the awards falls and the number of terminators vary with each of the plurality of available volatility selections such that no two of the volatility selections is associated with the same combination of award range and number of terminators.

12. The gaming machine of claim 1, wherein the outcomes associated with the displayed selectable elements are obscured from the player until selected by the at least one input device, and wherein the controller is further operative to, responsive to the player selecting one of the one or more terminators, cause the display device to reveal the remaining obscured selectable elements that were not selected by the player such that the display device displays any awards not awarded to the player and any remaining terminators not selected by the player.

13. A method, comprising:
- receiving inputs from a player via at least one input device, the inputs including a wager;
- receiving by a player a selection of a volatility corresponding to one of a plurality of available volatility selections;
- associating by a controller each of the volatility selections with a distinct composition of awards and one or more terminators such that no two of the volatility selections are associated with the same composition of awards and terminators and at least two of the volatility selections are associated with a different number of the one or more terminators;
- displaying on a display device a plurality of selectable elements corresponding to the awards and the one or more terminators of the composition associated with the volatility selected by the player;
- receiving, via the input device, successive selections by the player of the selectable elements until the player selects a selectable element corresponding to the one or more terminators; and
- causing the player to be awarded an award as a function of at least one of the awards associated with the selectable elements selected by the player prior to selecting the selectable element corresponding to the one or more terminators.

14. The method of claim 13, wherein the displaying includes displaying the plurality of available volatility selections including an indication of (a) a volatility associated with each of the available volatility selections, (b) the number of terminators associated with each of the available volatility selections, and (c) the awards associated with each of the available volatility selections.

15. The method of claim 14, wherein the number of terminators increases as the volatility associated with each of the available volatility selections increases.

16. The method of claim 13, wherein each of the distinct composition of awards includes any combination of credit amounts, free spins, and multipliers.

17. The method of claim 13, wherein the awards associated with one of the volatility selections has a range that is greater than a range of another of the awards associated with a different one of the volatility selections.

18. The method of claim 13, further comprising granting the player a predetermined number of selections of the plurality of selectable elements.

19. The method of claim 13, wherein each of the available volatility selections corresponds to an increasing volatility such that the awards associated with a lower volatility is selected from smaller awards and fewer terminators compared to the awards associated with a higher volatility, which is selected from larger awards and more terminators.

20. The method of claim 13, further comprising:
- associating each award of the awards associated with at least one of the volatility selections with an amount that is within an award range of a predetermined minimum and maximum number of credit amounts; and
- terminating further selections by the player of the selectable elements responsive to the player selecting the terminator via the at least one input device.

21. The method of claim 13, further comprising:
- associating, according to an award schedule, each award of the awards associated with at least one of the volatility selections with a number of free spins or multipliers;

accumulating the number of free spins or multipliers associated with the selectable elements selected by the player until the player selects the selectable element corresponding to the one or more terminators; and allowing the player to play a number of additional games corresponding to the accumulated number of free spins, such that the expected value of the additional games is increased as a function of the number of free spins and the multiplier values associated with the multipliers.

22. The method of claim 13, wherein the award values of the awards and the number of terminators vary with each of the plurality of available volatility selections such that no two of the available volatility selections is associated with the same combination of award values and number of terminators.

23. The method of claim 13, wherein an award range within which each of the awards falls and the number of terminators vary with each of the plurality of available volatility selections such that no two of the volatility selections is associated with the same combination of award range and number of terminators.

24. The method of claim 13, wherein the outcomes associated with the displayed selectable elements are obscured from the player until selected by the at least one input device, the method further comprising, responsive to the player selecting one of the one or more terminators, revealing the remaining obscured selectable elements that were not selected by the player such that the display device displays any awards not awarded to the player and any remaining terminators not selected by the player.

25. A non-transitory machine-readable storage medium including instructions which, when executed by one or more processors, cause the one or more processors to perform operations comprising:

receiving inputs from a player via at least one input device, the inputs including a wager;

receiving by a player a selection of a volatility corresponding to one of a plurality of volatility selections;

associating by the one or more processors each of the volatility selections with a distinct composition of awards and one or more terminators such that no two of the volatility selections are associated with the same composition of awards and terminators and at least two of the volatility selections are associated with a different number of the one or more terminators;

displaying on a display device a plurality of selectable elements corresponding to the awards and the one or more terminators of the composition associated with the volatility selected by the player;

receiving, via the input device, successive selections by the player of the selectable elements until the player selects a selectable element corresponding to the one or more terminators; and causing the player to be awarded an award as a function of at least one of the awards associated with the selectable elements selected by the player prior to selecting the selectable element corresponding to the one or more terminators.

26. The machine-readable media of claim 25, wherein the displaying includes displaying the plurality of available volatility selections including an indication of (a) a volatility associated with each of the available volatility selections, (b) the number of terminators associated with each of the available volatility selections, and (c) the awards associated with each of the available volatility selections.

27. The machine-readable media of claim 26, wherein the number of terminators increases as the volatility associated with each of the available volatility selections increases.

28. The machine-readable media of claim 25, wherein each of the distinct composition of awards includes any combination of credit amounts, free spins, and multipliers.

29. The machine-readable media of claim 25, wherein the awards associated with one of the volatility selections has a range that is greater than a range of another of the awards associated with a different one of the volatility selections.

30. The machine-readable media of claim 25, the operations further comprising granting the player a predetermined number of selections of the plurality of selectable elements.

31. The machine-readable media of claim 25, wherein each of the available volatility selections corresponds to an increasing volatility such that the awards associated with a lower volatility is selected from smaller awards and fewer terminators compared to the awards associated with a higher volatility, which is selected from larger awards and more terminators.

32. The machine-readable media of claim 25, the operations further comprising:

associating each award of the awards associated with at least one of the volatility selections with an amount that is within an award range of a predetermined minimum and maximum number of credit amounts; and terminating further selections by the player of the selectable elements responsive to the player selecting the terminator via the at least one input device.

33. The machine-readable media of claim 25, the operations further comprising:

associating, according to an award schedule, each award of the awards associated with at least one of the volatility selections with a number of free spins or multipliers;

accumulating the number of free spins or multipliers associated with the selectable elements selected by the player until the player selects the selectable element corresponding to the one or more terminators; and allowing the player to play a number of additional games corresponding to the accumulated number of free spins, such that the expected value of the additional games is increased as a function of the number of free spins and the multiplier values associated with the multipliers.

34. The machine-readable media of claim 25, wherein the award values of the awards and the number of terminators vary with each of the plurality of available volatility selections such that no two of the available volatility selections is associated with the same combination of award values and number of terminators.

35. The machine-readable media of claim 25, wherein an award range within which each of the awards falls and the number of terminators vary with each of the plurality of available volatility selections such that no two of the volatility selections is associated with the same combination of award range and number of terminators.

36. The machine-readable media of claim 25, wherein the outcomes associated with the displayed selectable elements are obscured from the player until selected by the at least one input device, the method further comprising, responsive to the player selecting one of the one or more terminators, revealing the remaining obscured selectable elements that were not selected by the player such that the display device displays any awards not awarded to the player and any remaining terminators not selected by the player.

* * * * *

UNITED STATES PATENT AND TRADEMARK OFFICE

CERTIFICATE OF CORRECTION

PATENT NO. : 8,371,927 B2
APPLICATION NO. : 11/922111
DATED : February 12, 2013
INVENTOR(S) : Allon G. Englman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1448 days.

Signed and Sealed this
First Day of September, 2015

Michelle K. Lee

Michelle K. Lee
*Director of the United States Patent and Trademark Office*